April 13, 1926.

A. W. NICHOLS 1,580,757

AMUSEMENT RIDING DEVICE

Filed Sept. 11, 1924

4 Sheets-Sheet 1

Alfred W. Nichols Inventor

By Charles W. Lovett

Attorney

April 13, 1926.

A. W. NICHOLS

AMUSEMENT RIDING DEVICE

Filed Sept. 11, 1924    4 Sheets-Sheet 2

1,580,757

Alfred W. Nichols Inventor

By Charles W. Lovett
Attorney

April 13, 1926.
A. W. NICHOLS
AMUSEMENT RIDING DEVICE
Filed Sept. 11, 1924     4 Sheets-Sheet 3
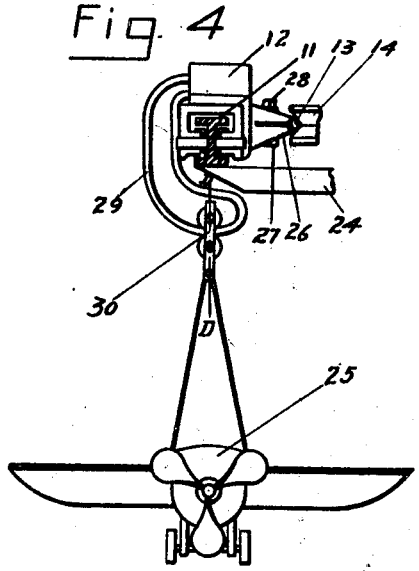
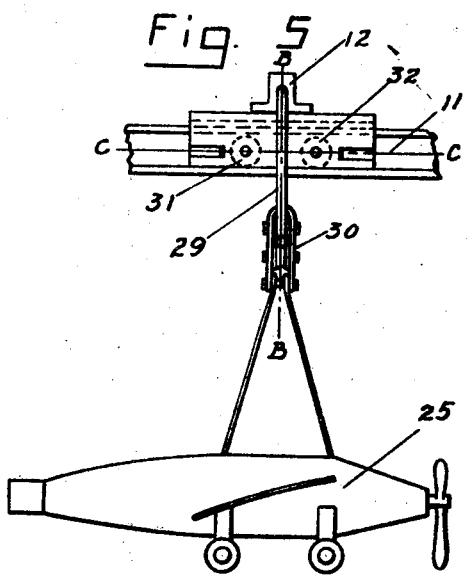
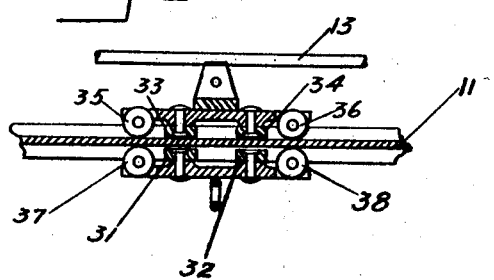
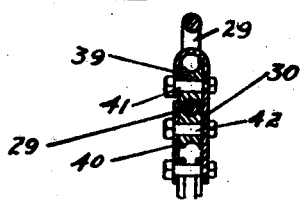
Alfred W. Nichols Inventor
By Charles W. Lovitt
Attorney April 13, 1926.
A. W. NICHOLS
1,580,757
AMUSEMENT RIDING DEVICE
Filed Sept. 11, 1924
4 Sheets-Sheet 4
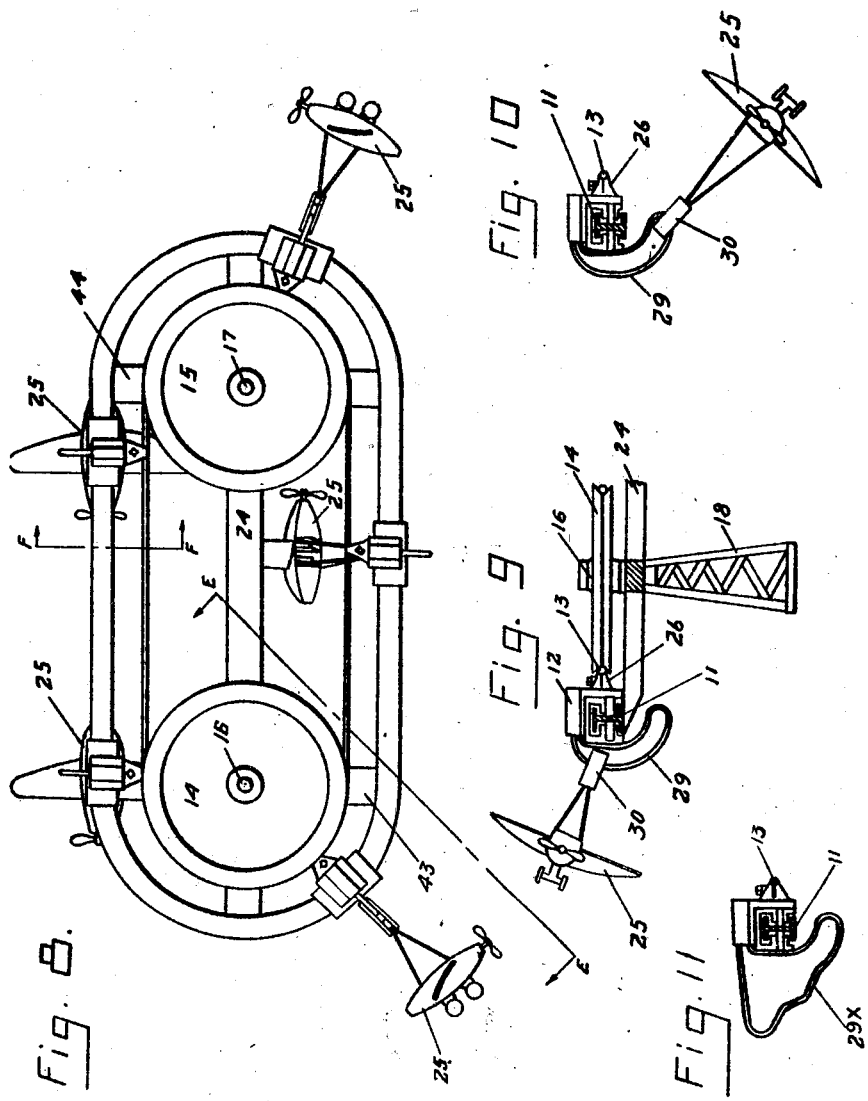
Alfred W. Nichols Inventor
By Charles W. Brett
Attorney Patented Apr. 13, 1926.

1,580,757

UNITED STATES PATENT OFFICE.

ALFRED W. NICHOLS, OF REVERE, MASSACHUSETTS.

AMUSEMENT RIDING DEVICE.

Application filed September 11, 1924. Serial No. 737,216.

*To all whom it may concern:*

Be it known that ALFRED W. NICHOLS, citizen of the United States, residing at 134 Kimball Ave., Revere, in the county of Suffolk and Commonwealth of Massachusetts, has invented certain new and useful Improvements in Amusement Riding Devices, of which the following is such a full, clear, and exact description as will enable others versed in the art to which it appertains to make and use the same.

My invention relates to amusement devices, and to the method of accomplishing the purposes hereinafter set forth.

My invention has for its objects: to provide a new and novel amusement device suitable for carnivals, picnic occasions, summer resorts, or other places where people congregate for their leisure or pleasure; to provide a new and novel method of operating swinging passenger carriers over a nearly elliptical course, controlled by combined gravitational, centrifugal, and centripetal forces, so as to gradually and repeatedly follow a direction outwardly, upwardly, either gradually, or in a series of minor ups and downs in a major upward movement, outwardly, to and above center, downwardly, either gradually or in a series of minor downs and ups in a major downward movement, and inwardly as motive power is applied driving said carriers about said course; to provide a new and novel equipment adapted to utilize the combined forces of gravitation, centrifugalization and centripetalization in the operation of swinging passenger carriers over a nearly elliptical course so as to gradually and repeatedly follow a direction outwardly, upwardly, outwardly, to and above center, downwardly and inwardly, as motive power is applied.

Figure 1:
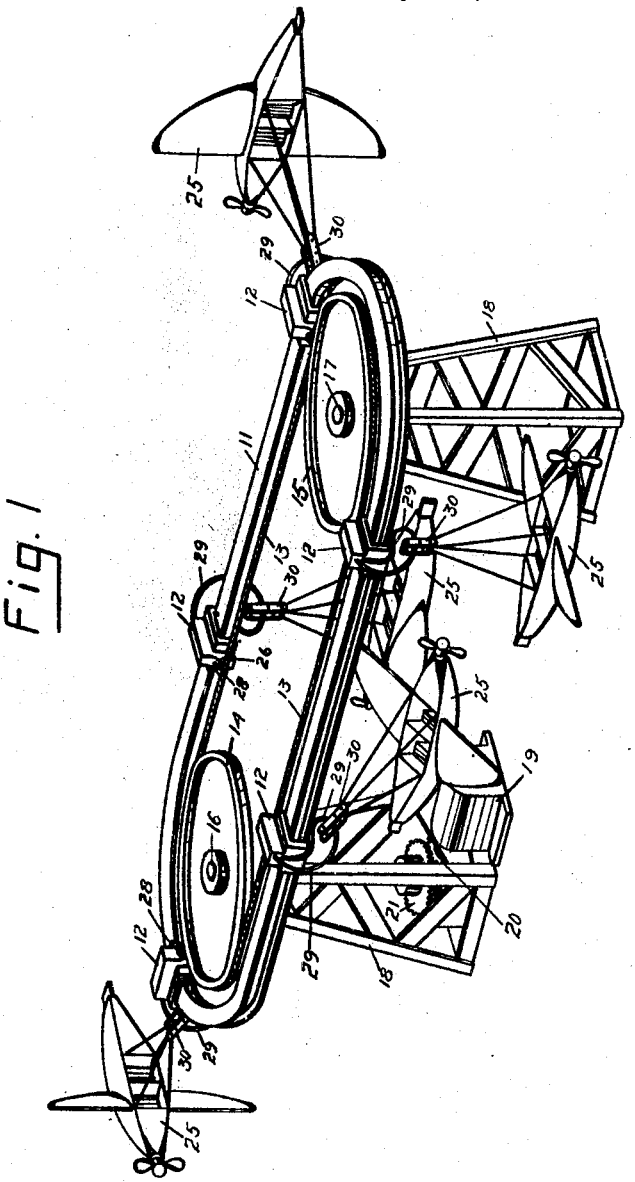
Figure 2:
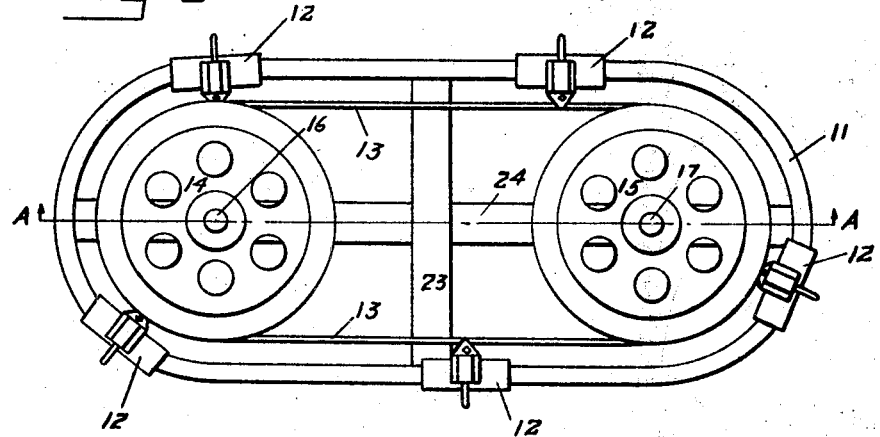
Figure 3:
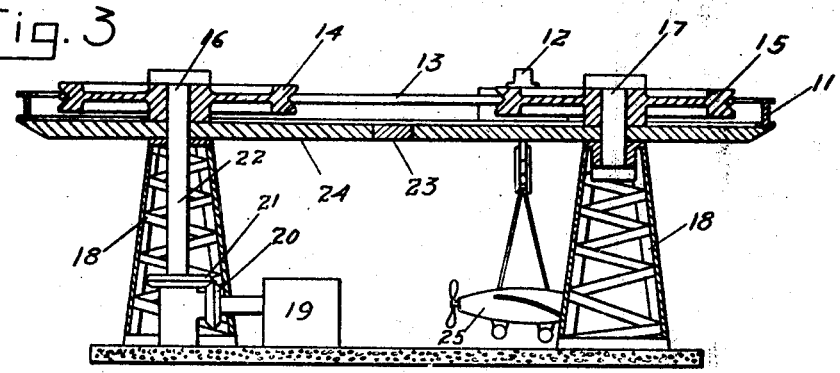

I accomplish the objects of my invention as shown in the accompanying drawings in which Figure 1 shows a perspective view of my device in action. Figure 2 shows a top view of the track portion of my device with the truck units positioned thereon. Figure 3 is a cross sectional view of the track portion of my device on the line A—A in Figure 2, having one passenger carrier in position thereon. Figure 4 shows a cross sectional view of a truck unit on the line B—B in Figure 5, showing a passenger carrier in position thereon. Figure 5 shows a side view of the truck unit. Figure 6 shows a cross sectional view of a truck unit on the line C—C in Figure 5, a portion of the power cable attached thereto also being shown. Figure 7 is a cross sectional view of the unit on the line D—D in Figure 4, by which unit the passenger carriage swings and operates on said truck. Figure 8 shows a top view of my device, showing the position of the passenger cars in action thereon. Figure 9 is a cross sectional view on line E—E in Figure 8, in the direction of arrows showing the position of a passenger car above center in its course about the end of track on which it travels. Figure 10 shows a cross sectional view on line F—F in Figure 8 showing the position of a passenger car inclined on its course intermediate the ends of my device. Figure 11 shows a varied construction of the carrying arm.

Referring again to Figure 2, 11 shows the track on which the truck units 12 travel, 13 shows the power cable moving over the pulleys 14 and 15 mounted on the frame of my device at 16 and 17.

Referring again to Figure 3, 18 shows the supporting standards, 19 shows an operating motor transmitting its power through the gears 20 and 21, to the shaft 22, and to the pulley 14 secured thereon. 23 and 24 show cross beams adapted to sustain the track 11. 25 shows a passenger car in position on the truck unit 12.

Referring again to Figure 4, 26 shows the fingers compressed by the bolt 27 and nut 28 to hold the cable 13. 29 shows the carrying arm in which swings the coupling 30 attached to the passenger car 25. As will be observed, the carrying arm 29 is supported by the truck unit 12 and extends downwardly therefrom in a plane intersecting the plane of the course substantially at right angles thereto, the upper terminal of the arm being above the plane of the course and the lower end being below the plane of the course and curved so as to extend inwardly under the track.

Referring again to Figure 5, 31 and 32 show the position of the weight bearing wheels on the track 11, wheels 33—34 operate likewise on the opposite side of track 11, (see Figure 6).

In Figure 6, the contacts of the track 11 with the wheels 35 and 36 on one side of track 11, and 37 and 38 on the other side, are shown, in which relation said wheels, steady the truck in its lateral movements on said track.

Referring again to Figure 7, 39 and 40 show two pulley wheels mounted respectively at 41 and 42 so as to minimize friction on the arm 29 as the passenger cars 25 swing thereon.

In Figure 8, the relative position of a series of passenger cars 25 are shown operating on the track 11, positioned equally distanced from each other. The cross arms 43 and 44 show optional construction for track steadying braces.

In Figure 11, the arm 29× is adapted for use in substitution of the arm 29 (Figure 10) and is provided with a plurality of bends arranged to present alternately raised and lowered portions for the purpose of producing a series of minor ups and downs in the major upward movement, and likewise a series of minor downs and ups in the major downward movement, of the passenger car 25 when mounted thereon. The series of ups and downs, and downs and ups, is produced as the coupling 30 moves along the alternately raised and lowered portions of the arm 29×.

A convenient number of passenger cars may be added, to conform to the size of the track construction used. I do not desire to confine myself to the specific details of construction herein shown, and such various changes and additions may be resorted to as will fall within the scope of my invention and the appended claims.

As power is applied in the operation of my device, the passenger cars follow a course over the track to which they are mounted by the trucks 12. In turning the corners, the cars swing outwardly. In returning from the corners to the sides, they swing inwardly. As the speed is increased, the outward and inward swings are correspondingly increased. At a given speed, the passenger car in position rounding the end, the outward swing is increased gradually to and above center. In finishing the turn, the car gradually gravitates until it reaches a point in its course at which it swings inwardly. Intermediate the ends, it assumes the position shown in Figure 8. This swinging motion about the course is continued as long as the motor power is applied. In all of the swinging positions, centrifugal force holds the passengers safely in their seats.

Having thus described my invention I claim as new and desire to secure by Letters Patent of the United States of America:

1. An amusement device comprising driving means adapted to follow a circular course in a horizontal plane and including an arm arched to extend vertically over and under the plane of the course on the outside thereof, a passenger-carrier, and means having the said passenger-carrier suspended therefrom and constrained to slide along the said arm from one end to the other thereof as the said passenger-carrier is alternately swung outwardly and inwardly by centrifugal and gravitational forces.

2. An amusement device comprising driving means arranged to follow a nearly elliptical course in a horizontal plane and including a carrying arm at right angles to the plane of the course, a passenger-carrier, and a coupling freely slidable on the said carrying arm from one end to the other thereof and having the said passenger-carrier suspended therefrom.

3. An amusement device including driving means arranged to follow a circular path in a horizontal plane and including an arcuate arm depending in a plane intersecting the plane of the path substantially at right angles thereto, a coupling slidable along the said arm from one end to the other thereof and mounted on wheels adapted to carry the said coupling and a passenger-carrier suspended from the said coupling.

4. An amusement device including a circular track disposed in a horizontal plane, a truck slidable thereon, means for propelling the truck, an arcuate arm carried by the said truck, a coupling constrained to slide along the said arm from one end to the other thereof, and a passenger carrier suspended from the said coupling.

5. An amusement device comprising a nearly elliptical track disposed in a horizontal plane, a truck slidable on the track, means for propelling the truck, a depending arcuate arm carried by the said truck and disposed in a plane at right angles to the plane of the track, a coupling arranged to slide freely along the said arm from one end to the other thereof, and a passenger-carrier suspended from the said coupling.

6. An amusement device comprising a nearly elliptical track disposed in a horizontal plane, a pulley at each end of the said track, a power cable extending around the said pulleys, said pulleys and said cable being encircled by the said track, means for driving one of the said pulleys, a truck mounted on the said track and connected to the said power cable, a vertically disposed carrying arm on the outside of the said truck and extending downwardly from a point above the track and curved at its lower end to extend under the track, a coupling constrained to travel along the said vertically disposed carrying arm from one end to the other thereof and a passenger-carrier suspended from the said coupling.

7. In an amusement device, a track and a truck unit arranged to slide on the track and presenting a downwardly extending substantially arcuate carrying arm to which a passenger-carrier is adapted to be slidably coupled so as to swing upwardly and downwardly with respect thereto, said carrying arm having a plurality of alternately raised and lowered portions for producing a series of minor ups and downs in the major upward movement of the passenger-carrier and likewise producing a series of minor downs and ups in the major downward movement of the carrier.

8. In an amusement device, a passenger carrier, and means for operating said passenger carrier over a nearly elliptical course and including a support from which the said passenger carrier is slidably and pivotally suspended so as to gradually and repeatedly follow a direction outwardly and upwardly above the course and downwardly and inwardly of the course as the said support and passenger carrier move over the said course, said support having an irregular surface producing a series of minor up and down movements in each of the major upward and downward movements of the passenger carrier.

In testimony whereof I affix my signature.

ALFRED W. NICHOLS.